US011317745B2

(12) United States Patent
Braveheart

(10) Patent No.: US 11,317,745 B2
(45) Date of Patent: May 3, 2022

(54) SECURABLE PLATE FOR A CHILD

(71) Applicant: Prodigi Kids, Inc., San Diego, CA (US)

(72) Inventor: Karen Braveheart, San Diego, CA (US)

( * ) Notice: Subject to any disclaimer, the term of this patent is extended or adjusted under 35 U.S.C. 154(b) by 0 days.

(21) Appl. No.: 16/019,088

(22) Filed: Jun. 26, 2018

(65) Prior Publication Data

US 2019/0387905 A1   Dec. 26, 2019

(51) Int. Cl.
*A47G 19/10* (2006.01)
*F16B 47/00* (2006.01)
*A47G 29/093* (2006.01)
*A47G 19/02* (2006.01)

(52) U.S. Cl.
CPC .......... *A47G 19/10* (2013.01); *A47G 29/093* (2013.01); *F16B 47/00* (2013.01); *A47G 19/027* (2013.01); *B65D 2313/06* (2013.01)

(58) Field of Classification Search
CPC ....... A47G 19/10; A47G 29/093; F16B 47/00; B65D 2313/06; B52B 11/005
USPC ................ 220/630, 632, 636, 483; 248/205.5–206.3
See application file for complete search history.

(56) References Cited

U.S. PATENT DOCUMENTS

| | | | | |
|---|---|---|---|---|
| 2,542,400 A | * | 2/1951 | Donofrio | A47G 19/10 248/362 |
| 2,623,369 A | * | 12/1952 | Haydu | A47G 19/10 248/362 |
| 6,131,865 A | * | 10/2000 | Adams | A47G 1/17 248/205.5 |
| 6,318,683 B1 | * | 11/2001 | Savoy | A47D 1/008 248/146 |
| 6,581,541 B2 | * | 6/2003 | Hollinger | A01K 5/0114 119/61.5 |
| 2015/0230637 A1 | * | 8/2015 | Kart | A47G 19/10 220/575 |
| 2015/0230638 A1 | * | 8/2015 | Jagger | A47G 19/10 220/574 |
| 2019/0024699 A1 | * | 1/2019 | Mutch | F16B 47/00 |

* cited by examiner

*Primary Examiner* — Don M Anderson
*Assistant Examiner* — Jennifer Castriotta

(57) ABSTRACT

A securable plate for infants having a sidewall projecting a length of a perimeter edge engages removably with a support surface using a suction cup. An opening in the sidewall provides a passage to lift the edge of the suction cup to disengage the suctioned engagement of the suction cup by lifting the edge of the suction cup or a release flap extending from it.

17 Claims, 4 Drawing Sheets

SECURABLE PLATE FOR A CHILD

BACKGROUND OF THE INVENTION

1. Field of the Invention

The present invention relates generally to plates on which food is served. More particularly, the invention relates to a plate which is easily securable and removable from a support surface by an adult on which food is served and eaten by an infant or child.

2. Prior Art

Infants and small children, once they are ready for eating solid food, are conventionally seated in a high chair having a tray support for food and drink, or they may be seated at a table on an elevated seat where the table provides the underlying support for a dish on which food is served. As is well known to any parent or caretaker for a small child, the fact that they are served food on a plate, does not necessarily mean that the child will eat the food so presented in an adult like fashion.

Indeed, for smaller children the food and the plate positioned in front of them results in behavior that while it includes eating, also includes repositioning of the food to areas of the support surface or tray in movements not intended by the child to place the food in their mouths. Additionally, the plate itself can easily become more of a toy or projectile for a child who considers eating time also time to play with both the food and utensils presented them.

While drinking vessels have evolved to prevent small children from spilling and otherwise making a mess with the contents of a cup or glass, plates continue to be a source of play where both the presented food and the plate itself can be moved, dropped or thrown during meal time. As such, infants and small children who may view meal time as play time, continue to place both food and more often than not, the plate itself, on which the food is presented, in less than desirable positions about the room where it is served. When the plate itself is dropped or thrown with food upon it, such cannot be re-served to the child and can be a source of frustration to parents and caretakers who must remake the meal and serve it again, with the scenario likely to repeat itself.

The device and system herein disclosed, provides a securable plate which also has a securable lid, both of which may be easily engaged and disengaged to limit access to the food on the plate to supervised eating times, and to secure the plate itself to an underlying surface. The plate is easily secured and removed from an underlying surface such as a table or tray using a suctioning component. The removably engageable suctioning component is in a biased pivoting engagement with the underside of the plate, to better resist impacts from a child which might cause a dismount of the suction cup holding the plate in operative removable engagement to the tray or table.

The forgoing examples of plates for children and infants and the limitations related therewith, are intended to be illustrative and not exclusive. The disclosed examples and background do not imply any limitations whatsoever on the secureable plate invention described and claimed herein. Various other limitations of the related art in food plates for infants and children are known, or such will become apparent to those skilled in the art upon a reading and understanding of the specification below and the accompanying drawings.

SUMMARY OF THE INVENTION

With respect to the above description of the device herein and method of employment therefor, before explaining at least one preferred embodiment of the herein disclosed securable plate for a child or infant in detail, it is to be understood that the invention is not limited in its application, to the details of construction and to the arrangement of the components of the device, nor the steps in any disclosed method, in the following description or illustrated in the drawings. The invention herein described is capable of other embodiments and of being practiced and carried out in various ways which will be obvious to those skilled in the art upon reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other devices, structures, methods and systems, for carrying out the several purposes of the present disclosed securable plate device and method herein. It is important, therefore, that the claims be regarded as including such equivalent construction and methodology insofar as they do not depart from the spirit and scope of the present invention.

It is an object of the present invention to provide a plate for food which is easily secured and removed from a table or tray by an adult, but which is secured in a manner preventing a child or infant user from removing it.

It is a further object of the present invention to provide such a securable plate which has a lid which is easily and quickly removably engageable so as to cover the food in segmented portions of the top surface when desired.

These and other objects, features, and advantages of the plate invention herein disclosed, as well as the advantages thereof over existing prior art, which will become apparent from the description to follow, are accomplished by the improvements described in this specification and hereinafter described in the following detailed description, which fully discloses the securable plate invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the removably securable plate device herein. It is intended that the embodiments and figures disclosed herein are to be considered illustrative of the invention herein, rather than limiting in any fashion.

DETAILED DESCRIPTION OF THE PREFERRED EMBODIMENTS OF THE INVENTION

Figure 1:
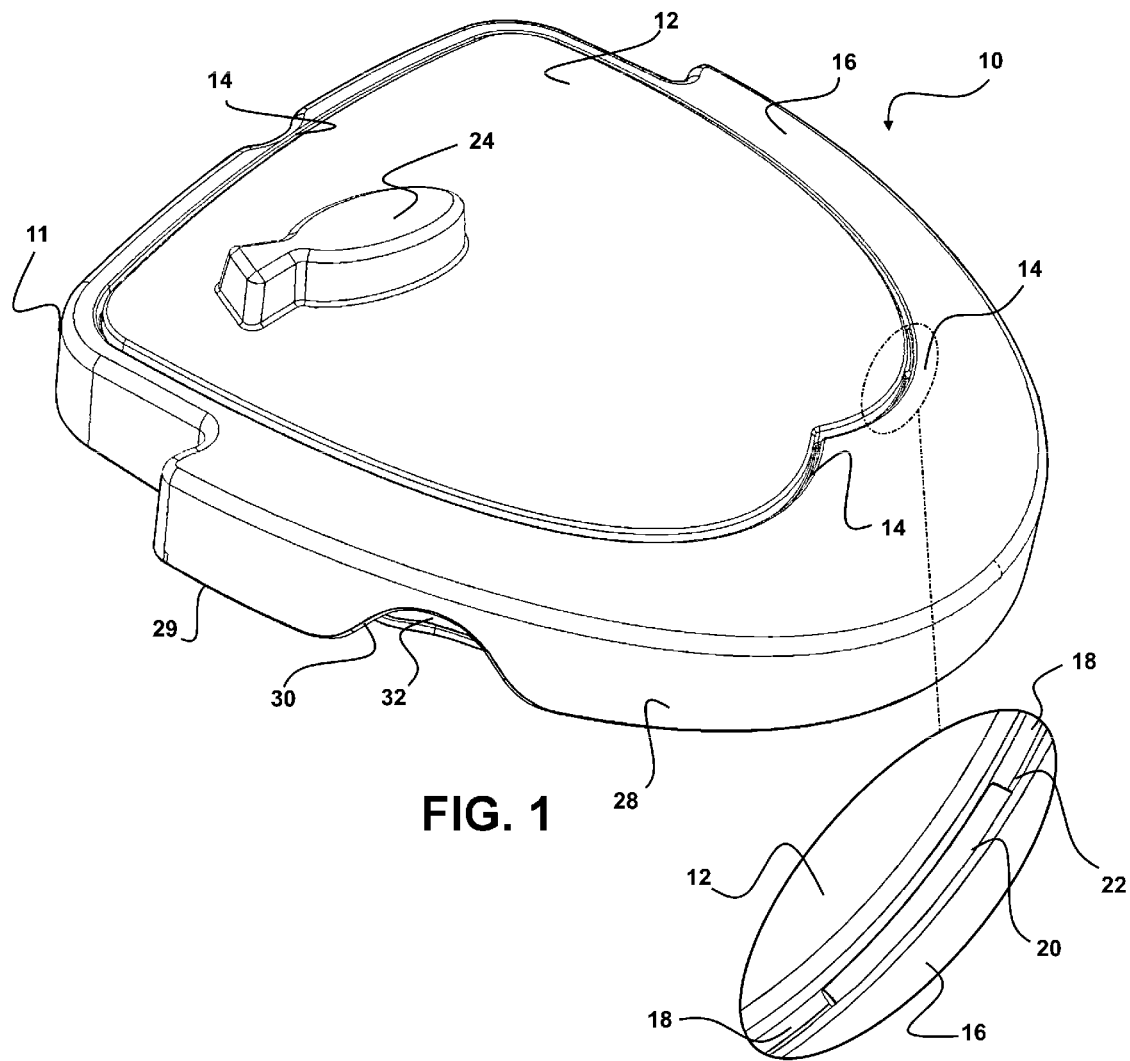
FIG. 1 depicts an overhead perspective view of the securable plate device herein showing the removable lid engaged to cover an underlying cavity on a top surface and also showing an enlarged view of an overhang on the plate which engages a ledge on the lid.

Referring now to the drawings of FIGS. 1-8 which depict modes of the device 10 herein, there is shown in FIG. 1, an overhead perspective view of the body 11 of the securable plate device 10 herein with a lid 12 in a plurality of removable connections 14 of the lid 12, with the top surface 16 of the body 11.

A favored mode of the removable connections 14 is shown in the enlarged view in FIG. 1, where a ledge 18 of the lid 12 is positioned in contact with and resting upon a ledge recess 22 formed into the top surface 16 of the body 11. This ledge recess 22 surrounds the ledge 18 projecting from the lid 12 and has a shape complimentary to the shape of the perimeter of the lid 12 which is defined by the ledge 18 projecting therefrom.

The lid 12 is formed of flexible material such that the ledge 18 is positionable under a plurality of projections 20 extending over and spaced from the ledge recess 22. As shown, two projections 20 are positioned at adjacent removable connections 14 on a side of the lid 12, opposite at least one removable connection 14 formed between a ledge 18 and a projection 20 on the opposite side of the lid 12.

Disengagement of the removable connections 14 is easy for an adult and almost impossible for a small child. Such removal is accomplished by gripping the handle 24 on the top of the lid 12, and urging the lid 12 in a direction toward the removable connections 14 on one side of the body 11 of the plate device 10. This causes a bending or flexing of the flexible polymeric or plastic material forming the lid 12 which deflects the ledge 18 on the side of the lid 12 opposite the direction of force, out from under the projection 20. Once so deflected, the lid 12 may be pulled by the handle 24 in a direction away from and above the top surface 16 of the body 11 of the plate device 10, whereupon a food cavity 26 (FIG. 3) is exposed which is adapted for holding food therein.

This disengageable lid 12, as noted, is easy to disengage for an adult with the strength to impart force to flex the lid 12 out of engagement with one or more projections 20. However, a small child has neither the strength nor the dexterity to accomplish the task. Thus, the device 10 may be positioned in front of a child with the lid 12 removably engaged, and left so until the parent or caretaker is positioned to watch and supervise the child during eating.

Figure 2:
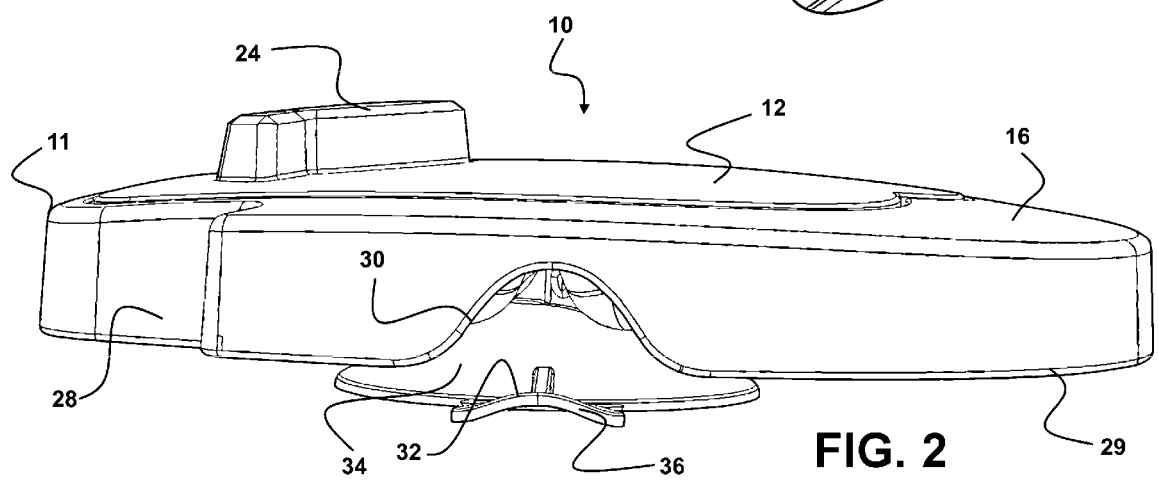
FIG. 2 shows a first side view of the plate device showing an opening in a sidewall providing finger access to a passage on a bottom side of the plate where a suction cup is engaged at a first end to the bottom of the plate and has a second end adapted for suction engagement with a support surface.
Figure 7:
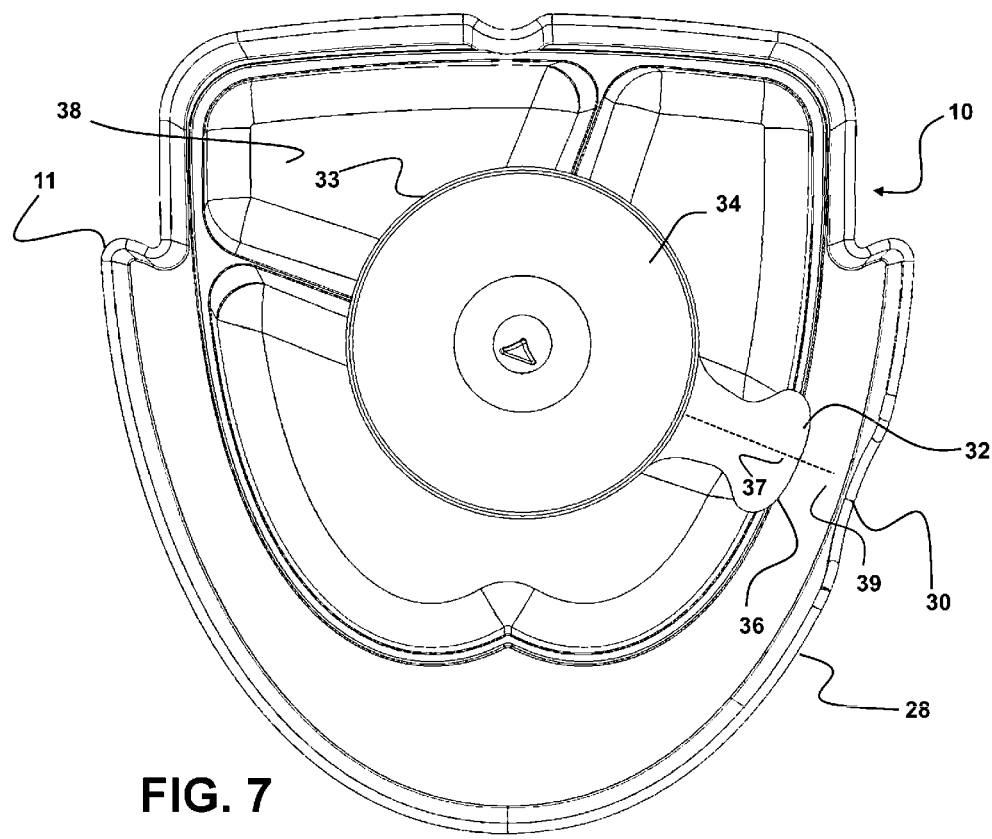
FIG. 7 depicts a view of the lower or bottom surface of the plate showing the suction cup in the engagement therewith and a flexible tab extending from the perimeter of the second end of the suction cup having an end spaced from the opening in the sidewall.

Shown in FIG. 2 and also in FIG. 1, is a sidewall 28 which projects away from the top surface 16 to a distal end 29 of the sidewall 28, and defines a perimeter edge of the body 11 of the plate device 10. As can be seen in FIGS. 1-2, an opening 30 is formed into the sidewall 28 and provides limited access to a release flap 32 extending to a distal end 36 from a first end engaged with the circumferential edge 33 of a suction cup 34. This release flap 32 as best seen in FIG. 7, extends a length along an axis 37 which is substantially aligned with a central area of the opening 30 in the sidewall 28, to a distal end 36. A pulling or a lifting of the release flap 32 provides a means to disengage the suctioned engagement of the suction cup 34 by releasing the seal at the circumferential edge 33 thereof.

This length of extension along the axis 37 from the circumferential edge 33 of the suction cup 34 to the distal end 36 is for a distance which creates a space or gap 39 from the distal end 36 of the release flap 32 and the plane of the sidewall 28 at the opening 30 in the sidewall 28 where the sidewall rests on the support surface 40. This gap 39 forms a visual barrier rendering the release flap 32 hidden from view of a child with their head located above the top surface 16 of the body 11 of the plate device 10. Currently, a gap 39 between ¼ inch to ¾ inch has been found in experimentation to work well to form a barrier to sight of the release flap 32 when viewed from over the top surface 16 of the body 11, which still allows for a user to project their fingers through the opening 30 to disengage a suctioned engagement of the suction cup 34 with the underlying surface 40.

The release flap 32 is shown formed to a flexible planar configuration where it parallels the support surface 40 on which it rests with the suction cup 34 in suctioned engagement. Originally a release flap 32 was formed which a ridge projecting from a top surface thereof, in a direction normal to the support surface 40 as an aid to disengagement of the suction cup 34. However, it was found in experimentation that a vertically disposed ridge (not shown) on the release flap 32, was much easier to disengage for children who were older such as 3-4 years old. When the release flap 32 was changed to a planar horizontal shape and smooth top surface as configured herein, the release flap 32 was found to be much harder for a child to contact, grip, and pull with sufficient force to disengage the suction cup 34. As such, the depicted planar configuration of the release flap 32 with a smooth planar top surface 41 (FIG. 8), was found to better serve a wider range of ages of children in keeping them from disengaging the plate device 11.

Further, the opening 30 is sized for the thumb and forefinger of an adult to project through and then position that thumb and forefinger under the bottom 38 of the body 11 which is held elevated above by the support surface 40 by support on the projecting sidewall 28. With this sidewall 28 in contact with the support surface 40 (FIG. 8) and the axis 37 of the projecting release flap 32 aligned substantially normal to a central area of the opening 30, the release flap 32 can be gripped and pulled by an adult to release the suction cup 34.

Additionally preferred is the forming the distal end 36 of the release flap 32 with memory material such the distal end 36 forms to a curve rising above the support surface 40 to form a cavity 45 (FIG. 8) between the release flap 32 adjacent the distal end 36 thereof, and underlying support surface 40. Such a cavity 45 was found to provide a tactile contact for adult users who could not see the flap when projecting fingers through the opening 30, to ascertain its presence and easily grip the release flap 32. Conversely, in experimentation and testing of the device 10, it was found that a small child or infant was incapable of ascertaining the hidden presence of the release flap 32 and lacked the dexterity and grip strength between a finger and thumb, which is required in order to first grasp the release flap 32 and then pull it upward and outward.

Figure 8:
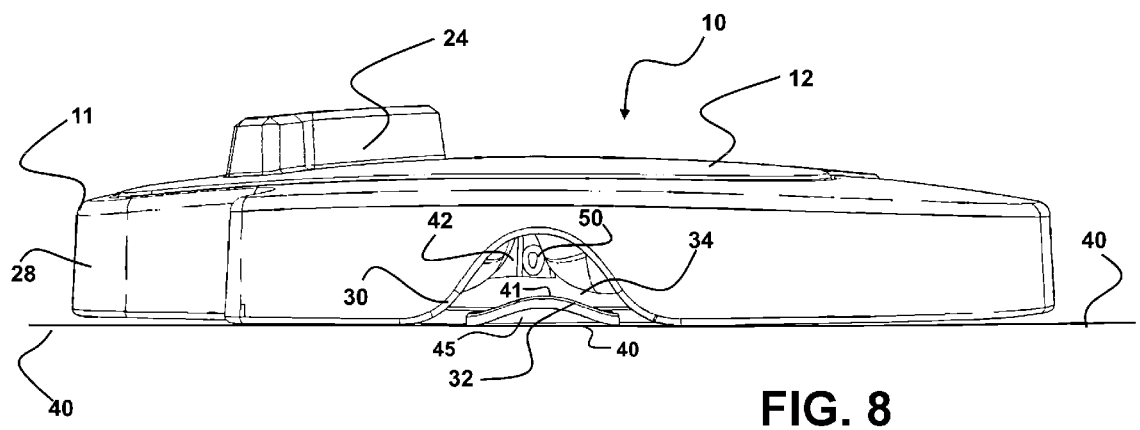
FIG. 8 depicts the plate device of FIGS. 1-7 in removable engagement with an underlying surface and held by suction from the suction cup and showing the release flap positioned substantially aligned with the opening but spaced from the sidewall.

The suction cup 34 seen in FIGS. 2 and 4-8, is formed of rubber or plastic or similar elastic material which will cause the suction cup 34 to impart suction to the underlying support surface when it is depressed from the disengaged configuration shown in FIG. 2, to the collapsed and engaged configuration of FIG. 8. The suction cup 34 in the disengaged configuration is sized such that the circumferential edge 33 thereof, extends or projects a longer distance from the bottom 38 of the body 11 than the length of the sidewall 28 to the distal edge 29. With the circumferential edge 33 projecting further from the bottom 38 of the body 11 than the sidewall 28, positioning to the collapsed configuration is accomplished by imparting force to the lid 12 when engaged, or to the top surface 16 of the body 11 of the plate device 10 with the suction cup 34 extending from the bottom of the body 11, while concurrently positioned adjacent the support surface 40.

Figure 3:
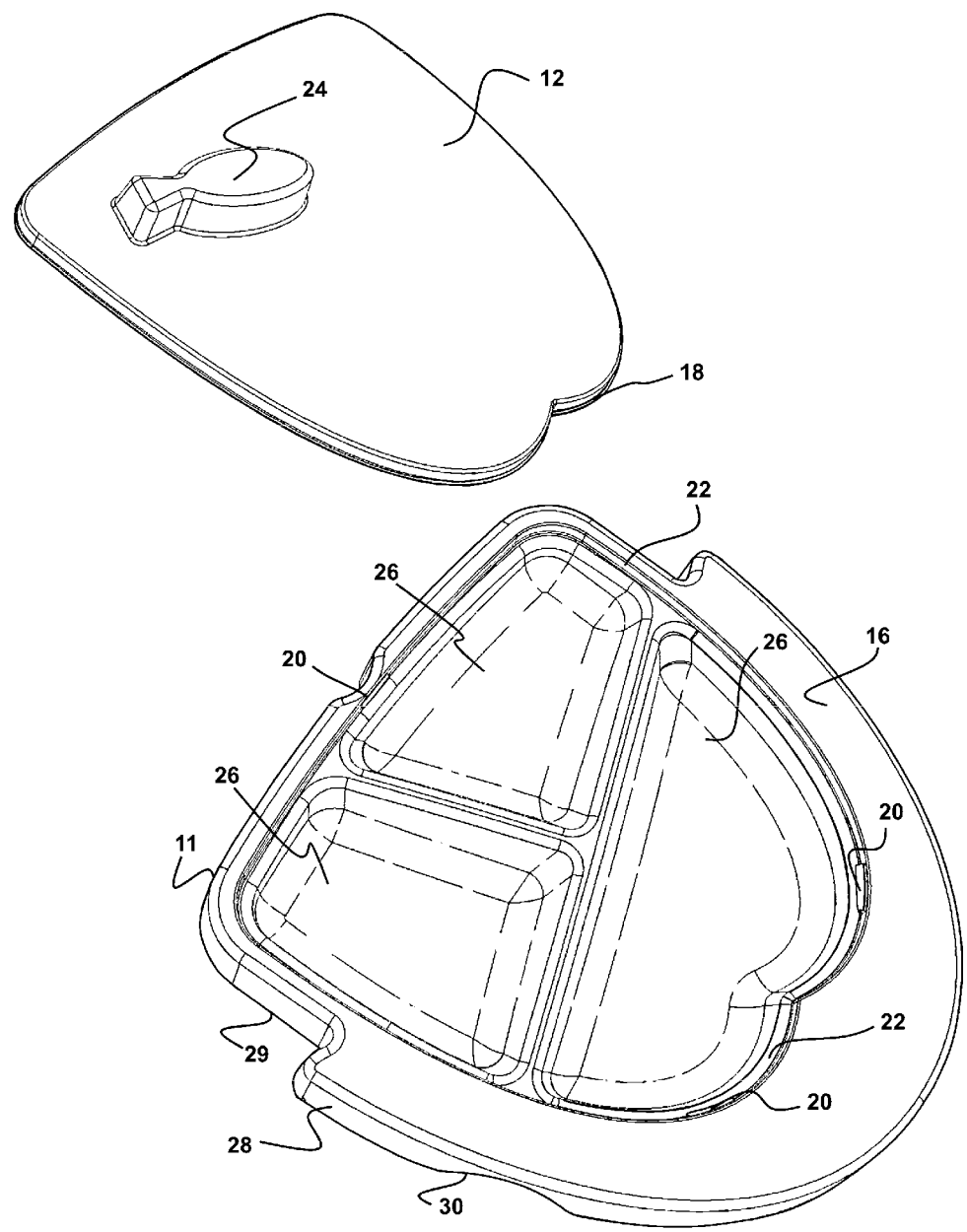
FIG. 3 is an overhead perspective view of the top of the plate device showing the removably engageable lid removed exposing the underlying cavity for food which may be segmented.

As shown in FIG. 3, the lid 12 is disengageable from the plurality of removable connections formed between the ledge 18 and the plurality of projections 20 adjacent and spaced from the ledge recess 22 formed into the top surface 16 of the body 11 of the plate device 10. This removal process was described above, and re engagement of the lid 12 to the removable connections 14 (FIG. 1) is accomplished in the reverse action where the ledge 18 of the lid 12 is engaged in a gap between the ledge recess 22 and one or more of the projections 20, and then forced toward that engagement by imparting force to the handle 24. This will flex the flexible lid 12 in the same fashion as removal except that the user will engage the opposing side of the lid 12 with the opposing positioned projection or projections 20.

Figure 4:
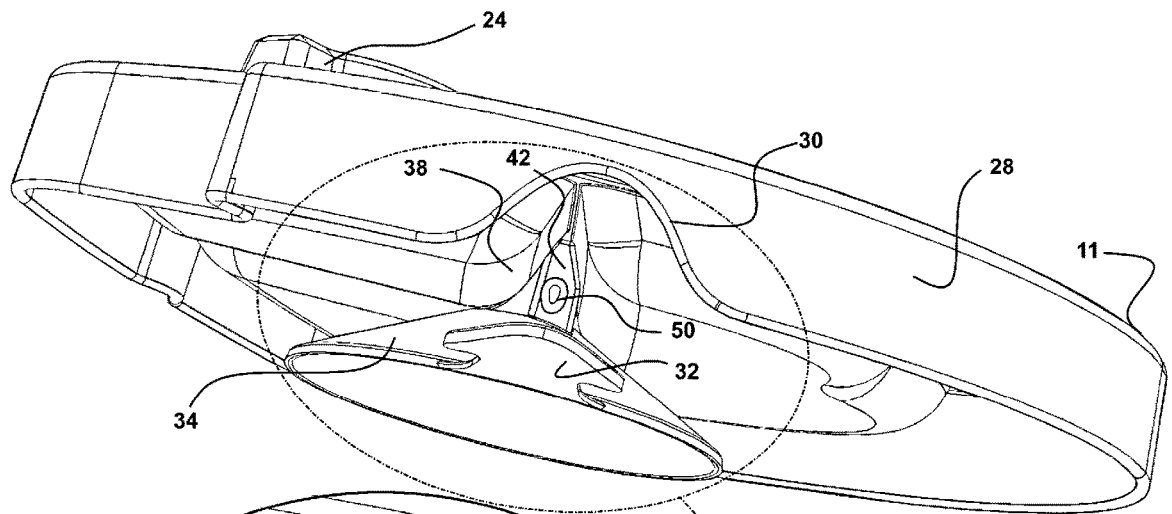
FIG. 4 depicts a perspective view from the first side of the plate device showing the first end of the suction cup in a rotational engagement with a post and angled sides contacting angled sides of the passage in which the post is positioned.
Figure 5:
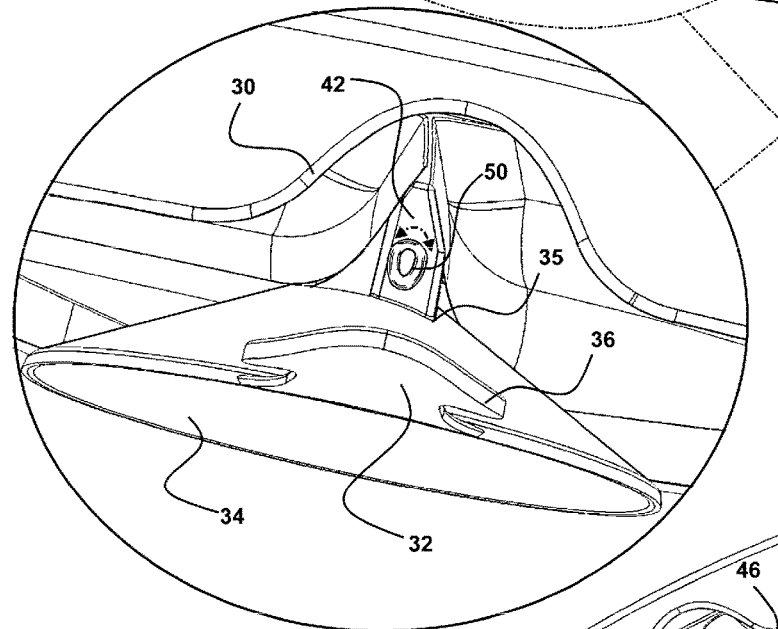
FIG. 5 is an enlarged view of the rotational engagement of a passage running through the first end of the suction cup with the post extending axially in the cavity which is substantially aligned with the opening in the sidewall of the plate.

As can be seen in FIG. 4 and the enlargement of FIG. 5, where the suction cup 34 is viewable through the opening 30 in the sidewall 28, a pliable projection 42 extends away from a connection with the first end 35 of the suction cup 34 to an engagement with the bottom 38 of the body 11 of the plate device 10. Originally, a fixed engagement was tried of the pliable projection 42 to the body 11. However, it was found in experimentation that force exerted against or to the sidewall 28 by a child had sufficient mechanical advantage to sometimes cause a dismount of the suction cup 24 from the support surface 40.

A number of connections for the suction cup 34 to the bottom 38 of the body 11 were tried and unexpectedly, a rotational connection of the mounting projection 42 extending from the suction cup 34 to the body 11, prevented such disengagement because the combination of flexing by the elastic flexible projection 42 along with a rotation thereof in the engagement to the bottom 38, prevented sufficient force from being imparted to disengage the suction cup 34.

Figure 6:
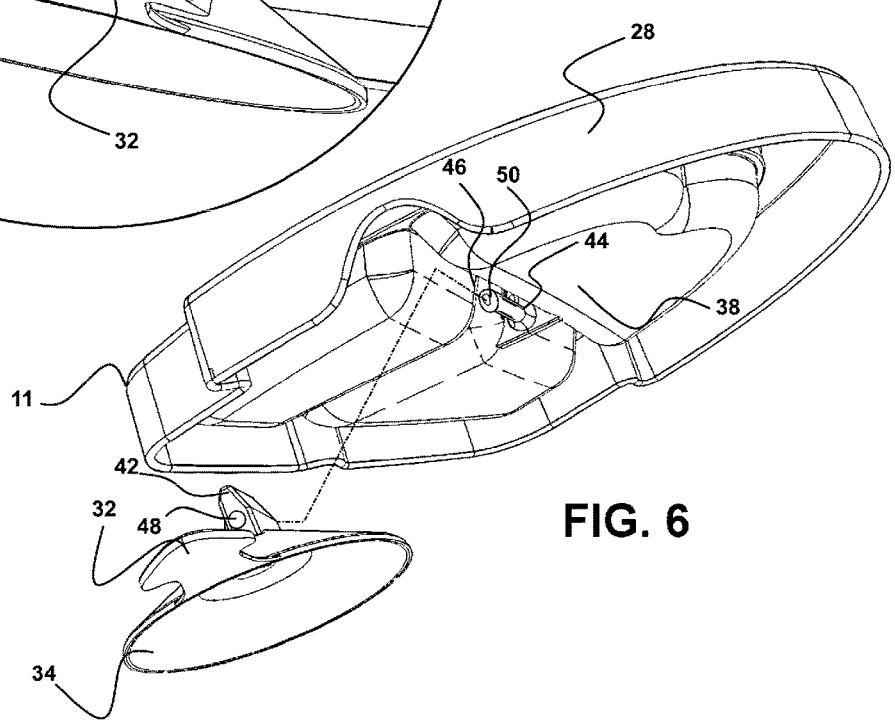
FIG. 6 shows a view of the lower side of the plate with the suction cup removed from a rotational mount on the post projecting within the cavity formed into the bottom surface which is aligned with an opening in the sidewall of the plate.

As can be seen in FIGS. 4-6, the rotational engagement of the suction cup 34 to the bottom 38 of the body 11 of the plate device 10 is formed by an elongated member 44 extending in a horizontal disposition, which is spaced from said bottom surface 38 of said body 11 such as shown in a cavity 46 formed on the bottom surface 38 of the body 11. The elongated member 44 preferably runs along an axis which is either aligned with or runs substantially parallel to the axis 37 of the release flap 32 as shown in FIG. 8. This has found to work better by allowing the suction cup 34 to rock or rotate on the elongated member 44 along the axis 37 and not easily dismount which concurrently aligning the release flap 32 with the opening 30 should the user dismount and be re engaging the suction cup 34.

An axial passage 48 communicating through the projection 42 is sized to engage upon and rotate upon the member 44. A cap 50 is shown positioned on the distal end of the member 44 and has a diameter larger than a diameter of the member 44 and the axial passage 48. Thus, the elastic material forming the projection 42 allows the axial passage 48 to stretch under force and slide over the cap 50 to a rotational engagement with the member 44, and holds the projection 42 in place. This also fixes the suction cup 34 in place, and holds the distal end 36 of the release flap 32, spaced away from the opening 30 in the sidewall 28 out of reach of small fingers.

FIG. 4 depicts a perspective view from the first side of the plate device showing the first end of the suction cup 34 in a rotational engagement with a post and angled sides contacting angled sides of the passage in which the post is positioned.

Additionally as shown in FIGS. 4 and 5 for example, the shape of the distal end of the projection 42 surrounding the axial passage 48 was found to provide a better and less noisy and vibrating engagement of the plate device 10 to a surface 40, if it were shaped complimentary to the shape of the cavity 46 defined by sides of the cavity 46. As such, as shown the side surfaces of the projection 42 are angled and shaped to substantially a mirror image of the angles of the bottom surface 38 forming the cavity 46, which as noted surrounds the member 44. By substantially is meant a mirror image but for slight deviations which may occur in manufacturing.

As noted, in FIG. 6 is shown a view of the bottom side 38 of the body 11 of the plate device 10, and shows the suction cup 34 removed from the rotational mount or engagement of the member 44 projecting within the cavity 46 formed into the bottom surface 38 which as noted runs axially within and is aligned with the cavity 46 and with the opening 30 formed in the sidewall 28 of the plate device 10. The sloped walls forming the cavity 46 can also be seen which are substantially matched by the shape of the opposing sides of the projection 42 from the suction cup 34.

In FIG. 7 is shown a top plan view of the bottom 38 of the body 11 of the plate device 10. As shown, the suction cup 34 is engaged with the bottom 38 and the flexible release flap 32 extends from the perimeter of the second end of the suction cup 34 toward but spaced from the opening 30 in the sidewall 28. Currently this space between the distal end 36 of the release flap 32 is preferably between one half inch to two inches.

An engaged configuration of the plate device 10 herein is shown in FIG. 8. As shown, the body 11 of the plate device 10 is in a removable engagement with an underlying support surface 40 and held in that position by the suction imparted by the collapsed suction cup 34 which can be seen through the opening 30 in the sidewall 28. The suction is releasable by pulling and/or lifting the release flap 32 in the manner described above which is shown aligned with the opening 30 but spaced from the sidewall 28 to maintain it out of reach and release by infants or child fingers but easily gripped and released by an adult with the dexterity and strength to overcome the suction to release the suction cup 34.

While all of the fundamental characteristics and features of the removably securable plate invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A securable plate, comprising:
   a body having a top surface configured to hold food and having a bottom surface opposite the top surface;
   a sidewall projecting a length around a perimeter edge of the body to a distal end of the sidewall;
   an opening formed in the sidewall;
   a suction cup in an engagement with the bottom surface of the body, the suction cup extending a distance away from the bottom surface to a circumferential edge;
   the distal end of the sidewall configured to support the body of the securable plate upon a support surface in an operative position;
   the suction cup configured for a removable suctioned engagement to the support surface with the securable plate in the operative position; and
   the suction cup being accessible through the opening whereby a lifting of the circumferential edge of the suction cup disengages the removable suctioned engagement to the support surface;
   a release flap extending from the circumferential edge of the suction cup with an axis of the release flap running toward the opening in the sidewall, wherein the release flap extends a length to a distal end thereof and the release flap is actuable for the lifting of the circumferential edge of the suction cup by a pulling or lifting of the distal end of the release flap; wherein the release flap includes a memory material along an upper surface of the release flap that forms a curved portion at the distal end of the release flap that forms a concave shape with respect to the support surface when engaged to the support surface; and
   a transitory cavity, at the distal end of the release flap, positioned between the curved portion of the release flap and the support surface with the suction cup in the removable suctioned engagement, wherein the transitory cavity is formed only when the suction cup is engaged.

2. The securable plate of claim 1, further comprising:
   a gap between the distal end of the release flap and the opening underneath the bottom surface of the body; and
   said gap defining a visual barrier to viewing the release flap through the opening.

3. The securable plate of claim 2, further comprising:
   the engagement of the suction cup with the bottom surface of the body being a rotational engagement between a member connected to the bottom surface of the body and a passage communicating through a projection on the suction cup.

4. The securable plate of claim 3, wherein the member runs along an axis aligned with or running parallel to the axis of the release flap.

5. The securable plate of claim 4, further comprising:
   the member positioned adjacent a cavity formed on the bottom surface of the body; and
   the projection on said the suction cup having an exterior surface thereon, the exterior surface of the projection located within and mirroring a shape of a cavity.

6. The securable plate of claim 3, further comprising:
   the member positioned adjacent a cavity formed on the bottom surface of the body; and
   the projection on the suction cup having an exterior surface thereon, the exterior surface of the projection located within and mirroring a shape of a cavity.

7. The securable plate of claim 1, further comprising: the release flap having a planar top surface and a planar lower surface prior to the suction cup being engaged on the support surface.

8. The securable plate of claim 7, further comprising:
   the engagement of the suction cup with the bottom surface of the body being a rotational engagement between a member connected to the bottom surface of the body and a passage communicating through a projection on the suction cup.

9. The securable plate of claim 8, wherein the member runs along an axis aligned with or running parallel to the axis of the release flap.

10. The securable plate of claim 9, further comprising:
    the member positioned adjacent a cavity formed on the bottom surface of the body; and
    the projection on the suction cup having an exterior surface thereon, the exterior surface of the projection located within and mirroring a shape of a cavity.

11. The securable plate of claim 8, further comprising:
    the member positioned adjacent a cavity formed on the bottom surface of the body; and
    the projection on the suction cup having an exterior surface thereon, the exterior surface of said the projection located within and mirroring a shape of a cavity.

12. The securable plate of claim 1, further comprising:
    the engagement of the suction cup with the bottom surface of the body being a rotational engagement between a member connected to the bottom surface of the body and a passage communicating through a projection on the suction cup.

13. The securable plate of claim 12, further comprising:
    said member positioned adjacent a cavity formed on the bottom surface of the body; and
    said projection on the suction cup having an exterior surface thereon, the exterior surface of the projection located within and mirroring a shape of a cavity.

14. A securable plate, comprising:
    a body having a top surface configured to hold food and having a bottom surface opposite the top surface;
    a sidewall projecting a length around a perimeter edge of the body to a distal end of the sidewall;
    an opening formed in the sidewall;
    a suction cup in an engagement with said the bottom surface of the body, the suction cup extending a distance away from the bottom surface to a circumferential edge;

the distal end of the sidewall configured to support the body of the securable plate upon a support surface in an operative position;

the suction cup configured for a removable suctioned engagement to the support surface with the securable plate in the operative position;

a release flap extending from the circumferential edge of the suction cup with an axis of the release flap running toward the opening in the sidewall, wherein the release flap extends a length to a distal end thereof and the release flap is actuable for lifting the circumferential edge of the suction cup by a pulling or lifting of the distal end of the release flap; wherein the release flap includes a memory material along an upper surface of the release flap that forms a curved portion at the distal end of the release flap that forms a concave shape with respect to the support surface when engaged to the support surface; and a rotational connection including a mounting projection extending from the suction cup to the body, the rotational connection configured to secure the suction cup to the body using an elongated member aligned with a release flap, the elongated member extending through the rotational connection and into a cap, the rotational connection configured to allow the suction cup to rock or rotate along an axis and not easily dismount the suction cup from the support surface.

15. The securable plate of claim 14, further comprising an axial passage communicating through the mounting projection that is sized to engage upon and rotate upon the elongated member on the bottom surface of the body.

16. The securable plate of claim 15, wherein the elongated member runs along an axis which is either aligned with or runs substantially parallel to the axis of a release flap connected to the suction cup.

17. The securable plate of claim 14, wherein a shape of a distal end of the mounting projection is shaped complimentary to the shape of a cavity in the body defined by sides of the cavity.

* * * * *